United States Patent Office 3,605,897
Patented Sept. 20, 1971

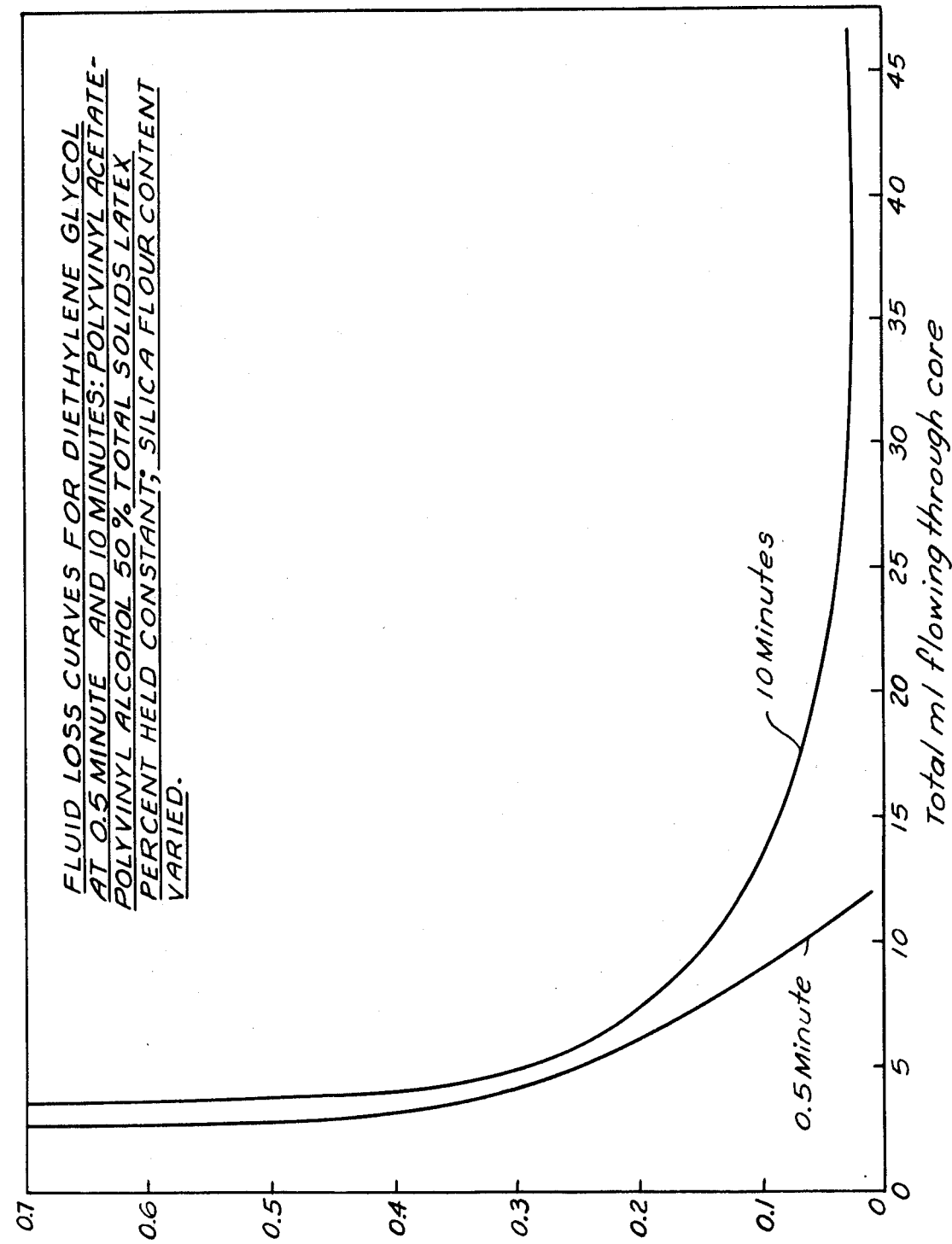

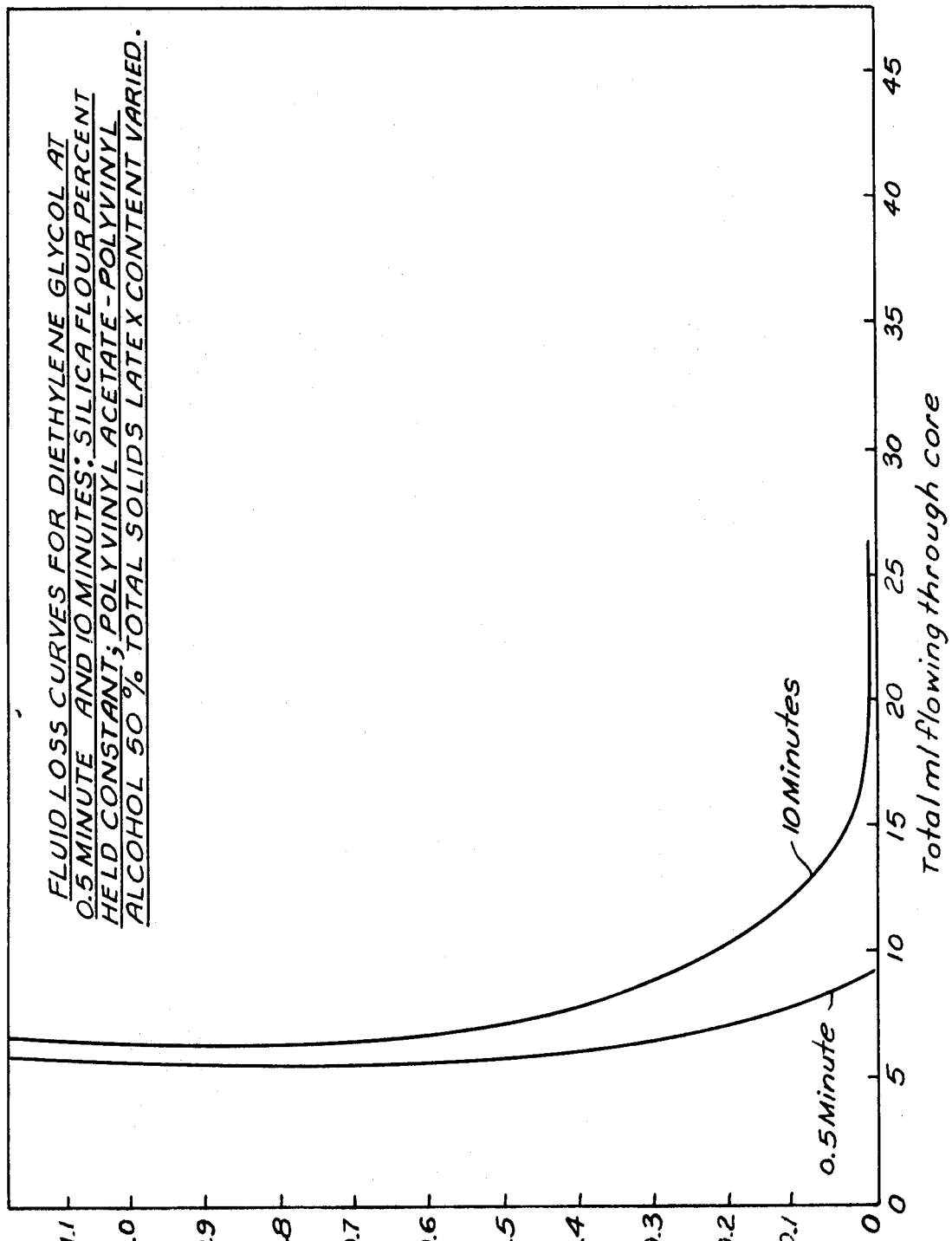

3,605,897
WELL TREATMENT METHOD USING FLUID-LOSS CONTROL AGENT FOR GLYCOLS
Oliver William Crinkelmeyer, Biloxi, Miss., and Edwin N. Alderman, Jr., Tulsa, Okla., assignors to The Dow Chemical Company, Midland, Mich.
Filed Dec. 3, 1968, Ser. No. 780,778
Int. Cl. E21b 33/13
U.S. Cl. 166—291
5 Claims

ABSTRACT OF THE DISCLOSURE (1) A composition of matter having low fluid-loss through pores, cracks and small openings in solid surfaces in contact therewith comprising a polyalcohol (e.g., glycols or polyglycols), silica fluor, and polyvinyl acetate-polyvinyl alcohol polymer and (2) use therefor in well treatments and cooling systems wherein a glycol or polyglycol is employed.

---

This invention relates to inhibition of loss of a polyalcohol in contact with a porous, cracked, or perforated surface of a solid in contact therewith. The practice of the invention is especially useful in well treatments and in inhibiting leaks in cooling systems.

Polyalcohols, particularly glycols, in contact with a porous geologic formation, tend to seep into the formation thereby being lost before they have fully achieved their purpose as a continuous body of liquid.

Glycols, used in radiators or other temperature control systems may be lost where a small crack or opening exists in the confining walls.

Advantages of materials known to be effective as additives in either petroleum-type oils or aqueous liquids have not shown acceptable efficacy as fluid-loss control agents in polyalcohols such as glycols. Although the invention is applicable to polyhydroxyalcohols in general, the most practical aspects thereof concern glycols and polyalkylene glycols (often called polyglycols) and the discussion, hereinafter, for simplicity of expression, will be directed to such compounds and called glycols.

There is an especial need for use of a glycol, e.g. diethylene glycol, as a spacer between a composition injected down a wellbore (which is undesirably reactive with water or an aqueous fluid) and a preflush or post-flush or displacing liquid composition which contains water or a brine. Glycols have been found quite suitable for such use.

A particular use is in well sealing jobs wherein an aqueous sealant, e.g. an aqueous hydraulic cement slurry, and a polymeric sealant, e.g. one wherein only a trace or at least a critical maximum amount (in very minor proportions) of water is tolerated, are injected successively down a wellbore to be used in conjunction with, or as supplemental to each other in a single sealing job. In such instances a glycol buffer layer, injected between the aqueous hydraulic cement slurry and the water-sensitive polymeric slurry, performs admirably, so long as the glycol is not lost too rapidly to the formation. A water-sensitive polymer slurry may also be followed by an aqueous mud wherein a buffer is needed. However, the tendency of the glycol to be lost to the formation at a rate in excess of that which is tolerable has resulted in serious problems and less than satisfactory results.

Such agents as silica flour, various natural and synthetic latices, various natural gums (e.g. guar and tragacanth) clays, and the composition consisting essentially of selected oil-insoluble solids, an oil-soluble dispersing agent, and a glutinate prepared according to the Brown et al. U.S. Pat. 2,739,735 have been individually admixed, with glycols in efforts to inhibit fluid-loss therefrom, but without success.

We have discovered an unexpected synergistic beneficial effect on loss of fluid from a glycol to a geologic formation by admixing with the glycol, both silica fluor and a polyvinyl acetate-polyvinyl alcohol. These two materials in combination are an effective fluid-loss control additive for a glycol.

FIGS. 1 and 2 show the results of a series of examples of the invention wherein the ratio of the silica flour and the polyvinyl acetate-polyvinyl alcohol polymer is varied.

Sometimes up to 15% by weight of ethylene glycol is admixed with the silica flour and latex, to facilitate subsequent admixing with glycol and permit the mixture to remain stable in cold weather before admixture thereof with the bulk of glycol to be rendered less susceptible to being lost by leaks and through pores in the earth.

The silica flour (e.g., pulverulent silica) is that commonly available on the market by that term of a mesh size of less than 325 mesh (i.e. less than 44 microns) and usually of an average mesh size of less than about 10 microns.

Polyvinyl acetate-polyvinyl alcohol mixed polymers are commonly available. The most economical and also highly satisfactory form is that which results in the proportions existing following known polymerization processes. Polymerization is usually conducted in an alcohol medium in presence of an alkaline or acid catalyst. The polymer is usually separated, dried, and then reslurried in water (the polyvinyl alcohol being slowly soluble in water). The weights herein given for the polymer are for the latex. Such latex may have a total solids of between 20 and 70 percent by weight and most often of between 40 and 60, approximately 50 percent total solids, by weight, being common.

Methods of production of polyvinyl acetate-polyvinyl alcohol are well known. Numerous patents (e.g. U.S. 1,676,156; 1,971,951; 2,109,883) and literature references are readily obtainable describing this material and its preparation. A particularly informative reference is Vinyl and Related Polymers by Calvin E. Schildknecht, published by John Wylie and Sons, Inc., New York (1952), pages 323 and 354 and most especially pages 341 to 354 of Chapter VI. Other references recommended are: Vinyl Polymerization, vol. 1, part 1 by Ham, published by Marcel Dekker, Inc., New York (1967), pages 288 to 290 and Preparative Methods of Polymer Chemistry by Sorenson and Campbell published by Interscience Publishers, Inc., New York (1961), pp. 173 to 176.

In general, polyvinyl acetate in an alcohol solution may be converted to polyvinyl alcohol, i.e. —OCOCH$_3$ groups are replaced by —OH groups through alcoholysis. Polyvinyl alcohol is also admixed with vinyl acetate as an emulsifier during polymerization to yield polyvinyl acetate-polyvinyl alcohol. The polyvinyl alcohol is slowly water-soluble and the polyvinyl acetate-polyvinyl alcohol is available as an aqueous latex.

The ratio of polyvinyl acetate to polyvinyl alcohol depends upon the extent to which the acetate groups have undergone alcoholysis during polymerization and thereby were converted to hydroxyl groups. The extent of alcoholysis may be as little as 1 percent to be satisfactory for the practice of the present invention and that wherein substantially all the acetate groups have been converted to hydroxyl groups is acceptable. In other words, a latex having from about 1 percent to about 99 percent polyvinyl acetate and balance polyvinyl alcohol is acceptable for use in the practice of the invention. However, the usual polyvinyl acetate-polyvinyl alcohol latices commercially available have alcoholized to somewhere between 50 and 95 percent. 75 percent to 90 percent alcoholysis is most common. Although less correctly used, some texts refer to the change of the acetate groups to hydroxyl groups as hydrolysis and sometimes as saponification. The more exacting students in this field, however, prefer to use the term alcoholysis.

Polyvinyl acetate-polyvinyl alcohol mixtures are obtainable on the market under a variety of trade names. Usually, unless stated in the advertising literature, upon request a vendor of the polymer will provide the percent or extent of alcoholysis. Among the common trade names for polyvinyl acetate-polyvinyl alcohol polymers, in either dry form or latex form as desired, are: Polyco, Gelvatol, Solvar, Polyviol, Vinarol, Rhodovilo, and Alvyl. Common ratios of vinyl acetate units to vinyl alcohol units of the mixed polymer are 91:9; 88:14; 86:14; and 82:18. Other ratios of polyvinyl acetate to polyvinyl alcohol may be obtained if desired. Aqueous solutions or dispersions are commonly available as 20 to 70 percent total solids. Polyvinyl acetate-polyvinyl alcohol polymer is also available in organic solvents, e.g. in toluene or methyl acetate, if desired. Viscosities of the various commercially available latices, as measured in a 4 percent solution in water at 20° C., vary from 4 to 75 centipoises.

Although any great amount of water in the composition of the invention is objectionable when used as a buffer between a water-sensitive liquid and one containing water, that amount of water provided by the latex is insufficient to be a measurable objection.

The weight percent of each of the silica flour and polyvinyl acetate-polyvinyl alcohol latices of an acceptable total percent solids may vary over a rather wide range. An operable amount of each to employ in the practice of the invention in the glycol, based on the weight of glycol, so that the glycol will be less susceptible to being lost to a porous formation in contact therewith is within the range of between 0.05 and 5.0 percent by weight of the silica flour and between 0.05 and 10.0 percent by weight of the polyvinyl acetate-polyvinyl alcohol. A recommended ratio is between about 1 percent and 3 percent of each of the components, best results being obtained by using between about 3.0 and 1.2 parts of the polyvinyl acetate-polyvinyl alcohol to 1 part by weight of the silica flour, e.g. 2:1, within the ranges suggested.

The following comparative tests (identified by letters) and examples of the invention (identified by numerals) were performed.

In the comparative tests, the particular synergistic combination of the invention was not used, or was used in admixture with a liquid other than a polyhydroxy alcohol. The examples of the invention were prepared as follows:

The tests were conducted as follows:

Berea sandstone cores, 1 inch in diameter and 12 inches long, were cut. A fluid-loss apparatus known as Magcobar unit (obtainable from Magnet Cove Barium Corporation, 3133 Buffalo Speedway, Houston, Tex.) was set up. This apparatus is adopted to accommodate such size cores. This cell permits passage through a core therein, of a fluid under pressure, axially only, and prevents any passage circumferentially along the outer surface of the core.

The cores had a natural porosity of between 500 and 600 millidarcys. They were first saturated with NaCl (API concentration) brine to standardize them. The liquid to be tested was then put in the pressure chamber of the apparatus (which was equipped with a stirrer and capable of being put under pressure). Pressure was applied and the liquid forced into and through the test core, held in place by the Magcobar apparatus. The volume through the core was measured after 0.5, 1.0, 2.0, 4.0, 6.0, and 10.0 minutes, measured from moment the pressure was applied.

The comparative tests results are set out in Table I.

TABLE I.—COMPARATIVE TESTS 100 milliliter specimens of diethylene glycol, each containing one of the following additives in the amount given at 100 p.s.i.g. pressure were tested

| Test identification: | Additive | Loss in 0.5 minute in ml. | Time required for 50 ml. of flow in minutes |
|---|---|---|---|
| A | 0.5 gram silica flour | 9 | 4.3 |
| B | 0.6 gram of the mixture: 25 percent diatomite; 12.5 percent kaolin; 12.5 percent bentonite; 25 percent silica flour; 25 percent SHFL-1A polysaccharide (amylopectin) polymer. | 8 | 6.5 |
| C | Same as B except that the additive contained 25 percent by weight guar gum. | 8 | 6.2 |
| D | 1 percent of 50 percent total solids of: polyvinyl acetate-polyvinyl alcohol latex. | 12 | 2.7 |
| E | Adomite prepared according to U.S. Pat. 2,779,735 | (Incompatible with glycol) | |
| F | None | 11 | 3 |

100 ml. of the following alcohols to each of which was added the following additive at 100 p.s.i. pressure

| Test identification and mono-alcohol used: | | | |
|---|---|---|---|
| G, methanol | 0.5 to 50 percent total solids polyvinyl alcohol latex: 0.2 gram silica flour. | (¹) | 0.25 |
| H, propanol | do | (Latex coagulated) | |

¹ Too fast to measure accurately.

A number of other latices were substituted for the polyvinyl acetate-polyvinyl alcohol latex among which were the following: 75 percent vinyl chloride and 25 percent vinylidene chloride; 20 percent vinyl chloride, 5 percent ethyl acrylate, and 75 percent vinylidene chloride. None of these gave satisfactory control of fluid loss in the monoalcohols.

The results in Table I show that the silica flour or the polyvinyl acetate-polyvinyl alcohol, when used alone, or guar gum or known fluid-loss agents such as Adomite, are unsatisfactory in a glycol. They also show that the combination of silica fluor and polyvinyl acetate-polyvinyl alcohol, though synergistic in the polyhydroxyalcohols, are ineffective in a monoalcohol.

The results of the practice of the invention are shown in Table II wherein the following composition was prepared and tested:

0.3 percent of silica flour and 0.5 percent of a 50 percent by weight solids, of polyvinyl acetate-polyvinyl alcohol (Polyco 529) latex, were mixed together and tested in the Berea sandstone cores, 1 inch in diameter and 12 inches long.

TABLE II

In each instance in this table 100 milliliters of diethylene glycol were employed, to which was added the amount by volume of (1) silica flour and (2) the 50 percent total solids polyvinyl acetate-polyvinyl alcohol herein shown

| Example number | 50 percent polyvinyl acetate-polyvinyl alcohol in ml. | Silica flour in grams | Fluid loss in ml. after— | |
|---|---|---|---|---|
| | | | 0.5 minute | 10 minutes |
| 1 | 0.1 | 0.2 | 8 | 12 |
| 2 | 0.2 | 0.2 | 7 | 10 |
| 3 | 0.2 | 0.1 | 10 | 20 |
| 4 | 0.5 | 0.1 | 9 | 12.8 |
| 5 | 0.5 | 0.2 | 6 | 7 |
| 6 | 0.5 | 0.2 | 9 | 16 |
| 7 | 0.5 | 0.05 | 11 | 21 |
| 8 | 0.5 | 0.3 | 4 | 5 |
| 9 | 1.0 | 0.2 | 5.5 | 7 |

The following examples were performed to show the efficacy of the invention employing other types of polyalcohols than diethylene glycol.

TABLE III

In each instance in this table 100 mls. of the indicated glycol is employed to which were added the amount by volume of (1) silica flour and (2) the 50 percent total solids 50:50 ratio polyvinyl acetate-polyvinyl alcohol at 100 p.s.i. pressure.

| Example number | Liquid tested | Polyvinyl acetate-polyvinyl alcohol in MlS | Silica flour (grams) | Amount through in— ½ minute in ml. | 10 minutes in ml. |
|---|---|---|---|---|---|
| 10 | Propylene glycol | 0.5 | 0.2 | 4.5 | 7.6 |
| 11 | Ethylene glycol | 0.5 | 0.2 | 5 | 6 |
| 12 | 50 percent ethylene glycol plus 50 percent water | 0.5 | 0.2 | 6 | 8.5 |
| 13 | 40 percent ethylene glycol plus 60 percent water | 0.5 | 0.2 | 7 | 8.6 |
| 1 | 100 percent water | 0.5 | 0.2 | 7 | 14 |

Reference to Table III shows fluid-loss from various glycols and glycol-water mixtures is greatly reduced by the practice of the invention.

EXAMPLE 14

This example is illustrative of the significance of the effect of varying the amount of silica flour while maintaining the amount of the polyvinyl acetate-polyvinyl alcohol constant in diethylene glycol.

A series of tests was conducted, wherein the polymer was held at 0.5 part by weight while the silica flour was increased by increaments of about 0.1 part by weight. The loss in milliliters through the sandstone cores (of the size used above while positioned in the Magnovar apparatus and tested as above) was measured after 0.5 minute and after 10.0 minutes. The results are shown graphically in FIG. 1.

EXAMPLE 15

Example 14 was repeated except that the amount of silica flour was held constant and the amount of the polymer increased in increments of about 0.1 part by weight. The results are shown graphically in FIG. 2.

A study of FIGS. 1 and 2 shows that after the initial spurt is measured after 0.5 minute (which allows the combined fluid-loss control agent of the invention to enter the pores) the fluid-loss is almost negligible. It also shows that the agent becomes very effective at about 0.05 percent and, after about 0.1 percent, is highly effective, and becomes almost constant after about 0.3 to 0.5 percent. It also shows that the ratio of silica flour to polymer is not highly significant so long as there is at least about 0.1 percent of each of the two components and preferably at least about 0.2 percent of the polyvinyl acetate-polyvinyl alcohol polymer.

EXAMPLE 16

The invention may be practiced in a well treatment as follows:

A water sensitive chemical seal composition, prepared according to claim 1 of Ser. No. 548,134 filed May 6, 1966, now U.S. Pat. No. 3,493,529, consisting essentially of a glycol, polyacrylamide, and a trace of water is to be injected down a wellbore and displaced by a water base clay mud. The polymer composition is prepared and pumped down the well followed by the composition of the invention, prepared according to any one of the examples above, in sufficient amount to provide at least about two vertical feet in the wellbore. The composition of the invention is thereafter followed by the water-base clay mud, thereby preventing presetting of the polymer slurry.

EXAMPLE 17

A well, experiencing encroachment of water is to be sealed by an hydraulic cement slurry and a water sensitive polymer slurry. The composition of the invention is injected between the cement slurry and polymer slurry during emplacement thereby preventing pre-setting the polymer slurry.

EXAMPLE 18

A liquid temperature control employing a glycol or glycol-water solution, e.g. an automobile radiator, is showing loss of content due to a slow leak. Up to about 10 percent by weight of the contents of the system of silica flour and polyvinyl acetate-polyvinyl alcohol polymer in a ratio of 3.0 parts of the polymer to 1 of the silica flour, are admixed with the contents of the temperature control system.

Reference to the examples of the invention and to the comparative tests, shows the efficacy of the invention. Especial significance should be attributed to Test D wherein only polyvinyl acetate-polyvinyl alcohol latex was used and Test A wherein only silica flour was employed in contact to Examples 1 to 9 employing both the required latex and silica flour in accordance with the invention thereby showing the synergistic effect of the two additives employed according to the invention.

Having described our invention, what we claim and desire to protect by Letters Patent is:

1. The method of treating a porous formation penetrated by a wellbore wherein incompatible fluids, settable to fluid-sealing solids, are injected thereinto in succession and requiring separation until at least one has set, the improvement consisting essentially of injecting between said incompatible fluids as a buffering agent a low fluid-loss composition of matter consisting essentially of:
   (a) a polyhydroxy alcohol,
   (b) silica flour, and
   (c) polyvinyl acetate-polyvinyl alcohol in an organic carrier liquid, thereby preventing undesirably excessive loss of buffering agents to the formation until at least one of said incompatible fluids has substantially set.

2. The method according to claim 1 wherein the buffering agent employed is a low fluid-loss composition of matter consisting essentially of:
   (a) 100 parts of a polyhydroxy alcohol,
   (b) between about 0.05 and about 10.0 parts of silica flour, and
   (c) between about 0.05 and about 10.0 parts of polyvinyl acetate-polyvinyl alcohol in sufficient organic carrier liquid to be flowable, thereby preventing undesirably excessive loss of buffering agent to the formation until at least one of said incompatible fluids has substantially set.

3. The method according to claim 1 wherein the buffering agent employed is a low fluid-loss composition of matter consisting essentially of:
   (a) 100 parts of a polyhydroxy alcohol,
   (b) between about 0.05 and about 10.0 parts of silica flour, and
   (c) between about 3.0 and about 1.2 parts of polyvinyl acetate-polyvinyl alcohol per part of silica flour present, thereby preventing undesirably excessive loss of buffering agent to the formation until at least one of said incompatible fluids has substantially set.

4. The method according to claim 1 wherein the buffering agent employed is a low fluid-loss composition of matter consisting essentially of:
   (a) 100 parts of a polyhydroxy alcohol,
   (b) between about 0.05 and about 10.0 parts of silica flour, and (c) between about 0.5 and about 10.0 parts of polyvinyl acetate-polyvinyl alcohol in an organic carrier liquid wherein the weight ratio of polyvinyl acetate to polyvinyl alcohol is between about 1 percent to 99 percent and the concentration thereof in the organic carrier liquid is between 20 percent and 70 percent by weight, thereby preventing undesirably excessive loss of buffering agent to the formation until at least one of said incompatible fluids has substantially set.

5. The method according to claim 1 wherein the buffering agent employed is a low fluid-loss composition of matter consisting essentially of:
(a) 100 parts of a polyhydroxy alcohol,
(b) between about 0.05 and about 10.0 parts of silica flour, and
(c) between about 0.05 and about 10.0 parts of a polyvinyl acetate-polyvinyl alcohol in an organic carrier in an amount sufficient to provide between 40 percent and 60 percent by weight solution thereof, said organic carrier liquid being, selected from the class consisting of toluene, benzene, petroleum hydrocarbon liquids, methyl acetate, and mixtures thereof and the weight percent of the polyvinyl acetate of the total mixed polymer is 43 percent to 98.5 percent thereby preventing undesirably excessive loss of buffering agents to the formation until at least one of said incompatible fluids has substantially set.

References Cited
UNITED STATES PATENTS

| | | | |
|---|---|---|---|
| 2,109,883 | 3/1938 | Herrmann et al. | 260—91.3 |
| 3,123,138 | 3/1964 | Robichaux | 166—295 |
| 3,153,450 | 10/1964 | Foster et al. | 166—283 |
| 3,319,715 | 5/1967 | Parks | 166—283 |
| 3,396,790 | 8/1968 | Eaton | 166—300X |
| 3,407,878 | 10/1968 | Engle | 166—300X |

STEPHEN J. NOVOSAD, Primary Examiner

U.S. Cl. X.R.

166—295